US012496950B2

(12) United States Patent
Kwon et al.

(10) Patent No.: US 12,496,950 B2
(45) Date of Patent: Dec. 16, 2025

(54) HEIGHT ADJUSTABLE ASSIST HANDLE FOR VEHICLE

(71) Applicant: DAEHAN SOLUTION CO., LTD, Incheon (KR)

(72) Inventors: Choong Ho Kwon, Seoul (KR); Su Gyun Park, Incheon (KR)

(73) Assignee: DAEHAN SOLUTION CO., LTD., Incheon (KR)

( * ) Notice: Subject to any disclaimer, the term of this patent is extended or adjusted under 35 U.S.C. 154(b) by 309 days.

(21) Appl. No.: 18/200,103

(22) Filed: May 22, 2023

(65) Prior Publication Data

US 2023/0382286 A1 Nov. 30, 2023

(30) Foreign Application Priority Data

May 30, 2022 (KR) .......................... 10-2022-0065881

(51) Int. Cl.
*B60N 3/02* (2006.01)

(52) U.S. Cl.
CPC ............. *B60N 3/023* (2013.01); *B60N 3/026* (2013.01)

(58) Field of Classification Search
CPC ........... B60N 3/023; B60N 3/02; B60N 3/026
USPC ...................................................... 296/1.02
See application file for complete search history.

(56) References Cited

U.S. PATENT DOCUMENTS

| 2,672,103 | A | * | 3/1954 | Hohmes | .................... | B60N 3/02 |
| | | | | | | 280/751 |
| 8,052,188 | B2 | * | 11/2011 | Chernoff | ................ | B60N 3/023 |
| | | | | | | 296/214 |
| 2016/0121811 | A1 | * | 5/2016 | Kwon | ..................... | B60N 3/026 |
| | | | | | | 296/214 |
| 2019/0111821 | A1 | * | 4/2019 | Yu | .......................... | B60N 3/026 |

FOREIGN PATENT DOCUMENTS

| CN | 110371006 | A | * | 10/2019 | ............. | B60N 3/026 |
| CN | 118578959 | A | * | 9/2024 | ................ | B60N 3/02 |
| KR | 19980028347 | U | * | 8/1998 | ............. | B60N 3/023 |
| KR | 19990032563 | U | * | 7/1999 | | |

(Continued)

OTHER PUBLICATIONS

Translation of CN110371006A (Year: 2025).*

(Continued)

*Primary Examiner* — Jason S Morrow
(74) *Attorney, Agent, or Firm* — Dickinson Wright PLLC

(57) ABSTRACT

By separating a middle portion of a handle body to be divided into an adjustment part and support parts formed at both sides of the adjustment part and allowing the adjustment part to be connected to the support parts with extension members, it allows the extension members to get out of the support parts when only the adjustment part is gripped and pulled down to allow the adjustment part to move down so that an occupant with a small sitting height can also conveniently use the assist handle. In particular, by allowing the extension members to be integrally formed with the adjustment part at both ends of the adjustment part, when the (Continued)

adjustment part is formed, it is possible to easily manufacture the assist handle without undergoing a separate manufacturing process so that an occupant can conveniently use the assist handle by conveniently adjusting a height of the assist handle.

4 Claims, 6 Drawing Sheets

(56) References Cited

FOREIGN PATENT DOCUMENTS

| KR | 101416421 B1 | 7/2014 |
|---|---|---|
| KR | 1020210147482 A | 12/2021 |
| KR | 1020220011286 A | 1/2022 |

OTHER PUBLICATIONS

Translation of CN118578959A (Year: 2025).*
Translation of KR19980028347U (Year: 2025).*
Translation of KR19990032563U (Year: 2025).*

* cited by examiner

HEIGHT ADJUSTABLE ASSIST HANDLE FOR VEHICLE

CROSS-REFERENCE TO RELATED APPLICATION

This application claims priority to and the benefit of Korean Patent Application No. 10-2022-0065881, filed on May 30, 2022, the disclosure of which is incorporated herein by reference in its entirety.

BACKGROUND OF THE INVENTION

1. Field of the Invention

The present disclosure relates to an assist handle for a vehicle, and more specifically, to an assist handle for a vehicle provided with an adjustment part which is formed by partitioning a middle portion of the assist handle and to be connected to support parts for rotatably supporting the assist handle with extension members to perform height adjustment, thereby allowing an occupant to grip and use the adjustment part and the support parts together or conveniently use the assist handle by gripping and pulling only the adjustment part down to adjust the height according to a sitting height when gripping the assist handle by hand.

2. Discussion of Related Art

As illustrated in FIGS. 1 to 3, a head liner H for a vehicle is equipped with assist handles A. The assist handles A are in a state of being in close contact with positions formed on the head liner H when not in use and are unfolded at the positions and used when in use. These assist handles are used by an occupant who grips the assist handle by hand so that the occupant's body is not biased to one side during driving, and in addition to such a basic function, assist handles having various additional functions have been developed as in Patent Document 1 to Patent Document 3 below.

(Patent Document 1) Korean Patent Application Laid-Open No. 10-2022-0011286

An assist handle mounted on a head liner of a vehicle may be equipped with a hammer and used as a hammer for emergency escape and thus may be easily and conveniently used as the hammer at any time even without hurting an esthetic sense and beauty. In particular, since the assist handle is used as the hammer for emergency escape by connecting two pins for rotatably supporting the assist handle with an elastic band, rotating the elastic band about these pins, and then pressing the elastic band so that the two pins get out of the two pins together, anyone can easily and conveniently separate and use the handle as the hammer. In addition, since the elastic band is formed to be in close contact with an inner surface of the handle and rotated about the pins and pressed only in use, anyone can safely and easily separate and use the assist handle when used as the hammer for emergency.

(Patent Document 2) Korean Patent Application Laid-Open No. 10-2021-0147482

The Patent Document 2 discloses an emergency hammer using an assist handle for a vehicle, which constitutes a hammer body by separating a part gripped by hand from the assist handle mounted on an interior of the vehicle and used as a handle and constitutes a hammer at one side of the hammer body to be easily separated and used by pushing a button, thereby allowing a driver or an occupant to easily reach the hammer from a sitting attitude when stretching out a hand and quickly and safely use the hammer by pushing the button to easily separate the hammer. In particular, the Patent Document 2 provides an emergency hammer using an assist handle for a vehicle, which uses the handle part having the hammer as the assist handle in a non-emergency situation, and thus it is unnecessary to separately secure a space in which the emergency hammer is mounted and it is possible to allow the emergency hammer not to be normally exposed to the outside, thereby improving an esthetic sense and beauty of an interior space of the vehicle.

(Patent Document 3) Korean Patent No. 10-1416421

The Patent Document 3 relates to an assist handle for a vehicle, wherein both ends of a hand grip are each mounted to hinge-operate through a mounting plate on a headlining, a one-side mounting plate includes a return spring to provide a restoring force to the hand grip, the other-side mounting plate includes a damping device therein to absorb a restoring impact force, and the damping device includes a damper having hinge ends having hinge pins mounted at both sides of the other-side mounting plate, having a damper insertion part formed at one side between the hinge ends, having the hinge pins installed to pass therethrough in a state of being fitted into the damper insertion part, and having damping ends formed to protrude from one side and the other side of an outer circumferential surface of the damper, and a stopper formed inside the hinge part of the hand grip to damp a bidirectional rotation impact due to each damping end.

RELATED ART DOCUMENTS

Patent Documents (Patent Document 1) Korean Patent Application Laid-Open No. 10-2022-0011286 (published date: Jan. 28, 2022)
(Patent Document 2) Korean Patent Application Laid-Open No. 10-2021-0147482 (published date: Dec. 7, 2021)
(Patent Document 3) Korean Patent No. 10-1416421 (registered date: Jul. 1, 2014)

SUMMARY OF THE INVENTION

However, the following problems occur in the conventional assist handles.
(1) In order to grip and use the assist handle by hand, a sitting height should be a predetermined level or larger.
(2) That is, the assist handle is mounted on the head liner to rotate in place, and an occupant who intends to use the assist handle puts the assist handle back by hand and then grips and uses the assist handle by hand. Therefore, the occupant may use the assist handle only when a hand may reach the assist handle in a state of sitting on the seat.
(3) However, there are both a case in which occupants who may not use the assist handle, such as people with small sitting heights or children, are present and in particular, a case in which people who normally use the assist handle may not use the assist handle when using a vehicle with high interior space, such as a sport utility vehicle (SUV) or a van.
(4) Therefore, an occupant who may not grip the assist handle in a state of sitting on the seat or may not use the assist handle due to a small distance even when a finger reaches the assist handle may not take a stable attitude during driving, thereby losing a balance. This may also cause the occupant to lose the center of gravity and fall sideways or fall down, resulting in injury.

The present disclosure is directed to providing a height adjustable assist handle for a vehicle, which is configured to separate a middle portion of a handle body gripped by hand and partition the middle portion into an adjustment part and support parts formed at both sides of the adjustment part and allow the adjustment part to be connected to the support parts with extension members, thereby allowing the extension members to get out of the support parts when only the adjustment part is gripped and pulled down to allow the adjustment part to move down so that an occupant with a small sitting height can also conveniently use the assist handle.

In particular, the present disclosure is directed to providing a height adjustable assist handle for a vehicle, which is configured to allow extension members to be integrally formed with the adjustment part at both ends of the adjustment part, when the adjustment part is formed, thereby being easily manufactured without undergoing a separate manufacturing process so that an occupant can conveniently use the assist handle by adjusting a height of the assist handle.

In addition, the present disclosure is directed to providing a height adjustable assist handle for a vehicle, which manufactures the adjustment part with a length that is about ⅓ to ½ of a length of a handle body, thereby removing inconvenience when normally in use and allowing an occupant with a small sitting height to easily and conveniently use the assist handle.

A height adjustable assist handle for a vehicle includes a handle body (100) of which both ends are elastically supported by support brackets (B) mounted on a head liner (H) and installed to rotate in place, wherein the handle body (100) is divided into an adjustment part (110) formed by separating a middle portion thereof in a length direction and two support parts (120) configured to rotatably support on both sides of the adjustment part (110), both ends of the adjustment part (110) are formed with extension members (111) flexibly bent and stepped portions (112) formed on ends of the extension members (111), and the support parts (120) are formed with guide holes (121) configured to allow the extension members (111) to enter and exit and allow the stepped portions (112) to be caught to limit a length which allows the extension members (111) to get out of the guide holes (121).

The extension members (111) and the stepped portions (112) may be integrally formed when the adjustment part (110) is injection-molded.

The adjustment part (110) may be manufactured to have a length that is ⅓ to ½ of a length of the handle body (100).

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 4 is a view illustrating a state in which the assist handle according to the present disclosure is unfolded from the head liner, in which

FIG. 5 is an exploded view illustrating a configuration of the assist handle according to the present disclosure, in which

DETAILED DESCRIPTION OF THE INVENTION

Figure 1:
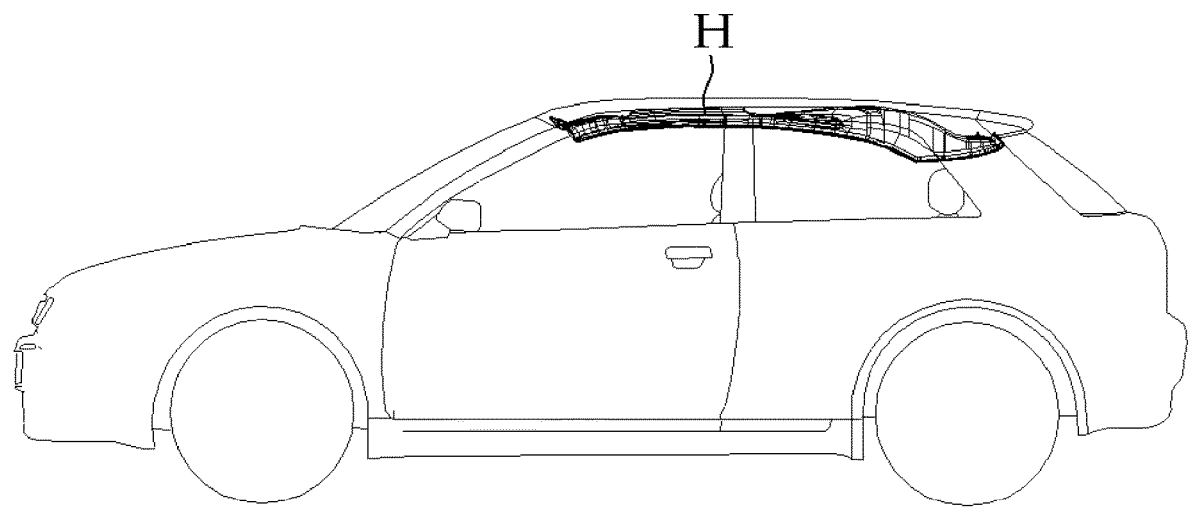
FIG. 1 is a side view of a vehicle illustrating a mounting position of a head liner on which an assist handle is mounted.
Figure 2:
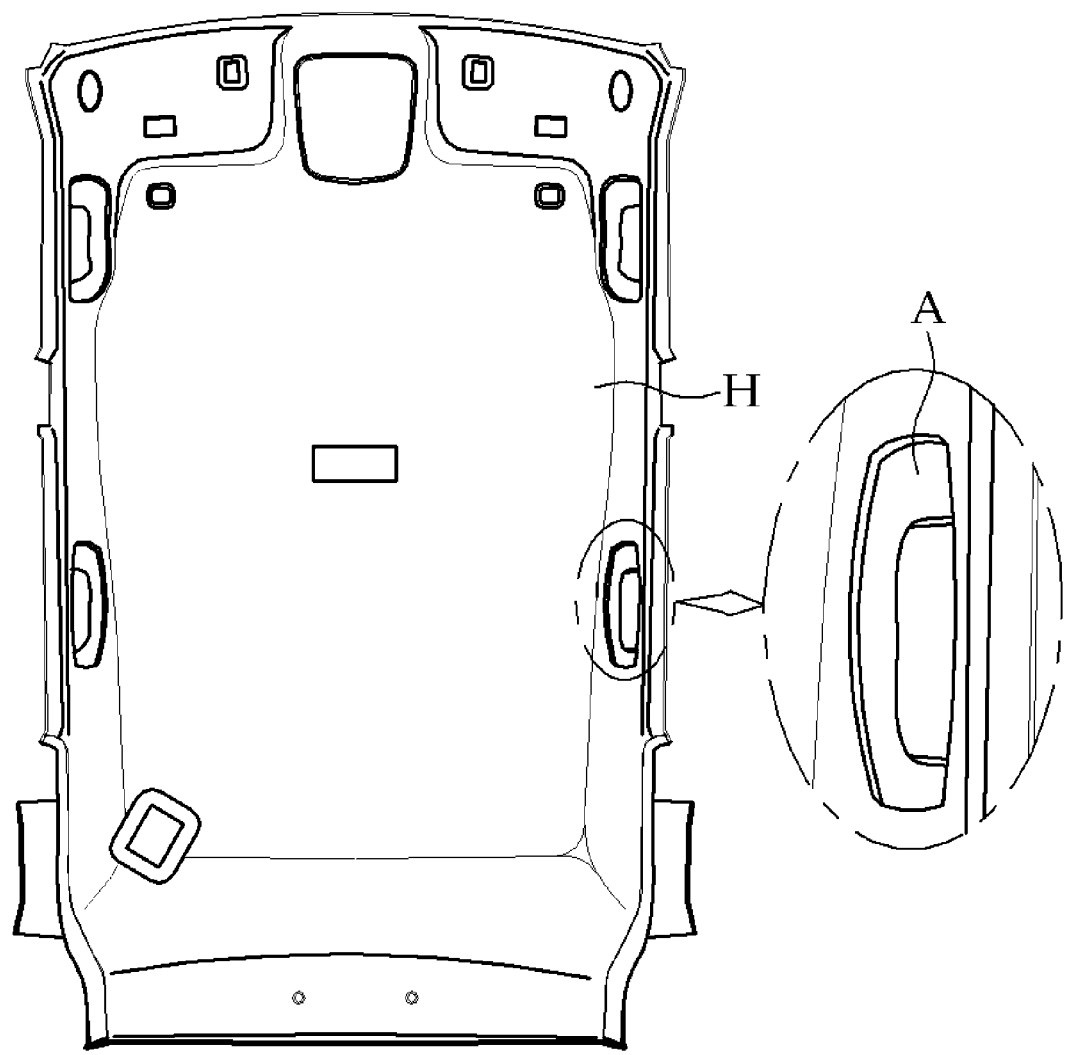
FIG. 2 is a plan view illustrating a head liner on which a conventional assist handle is mounted.
Figure 3:
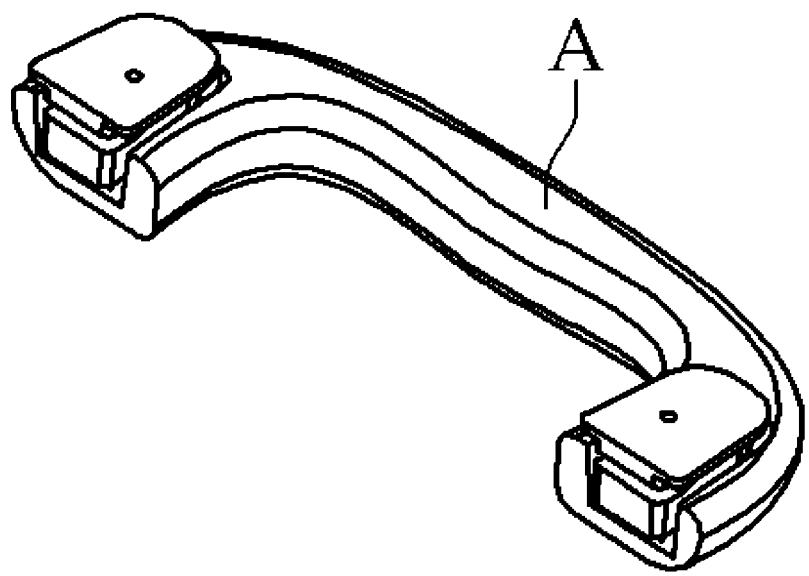
FIG. 3 is a perspective view illustrating one example of the conventional assist handle.

Hereinafter, exemplary embodiments according to the present disclosure will be described in detail with reference to the accompanying drawings. Prior to the description, terms or words used in the specification and claims should not be construed as being limited to their usual or dictionary meanings and should be construed as meaning and concept consistent with the technical spirit of the present disclosure according to a principle in which the inventors can appropriately define the concept of the terms in order to describe their inventions in the best method.

Therefore, since the embodiments described in the specification and the configurations illustrated in the drawings are only the most exemplary embodiment of the present disclosure and do not represent all of the technical spirit of the present disclosure, it should be understood that various equivalents and modified examples capable of replacing the embodiments and the configurations may be present at the time of this application.

Configuration of Height Adjustable Assist Handle for Vehicle

Figure 4A:
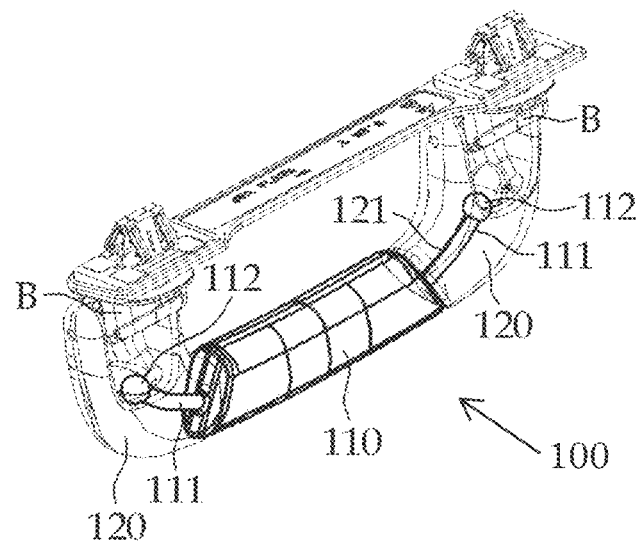
FIG. 4A is a perspective view and FIG. 4B is a front view.
Figure 4B:
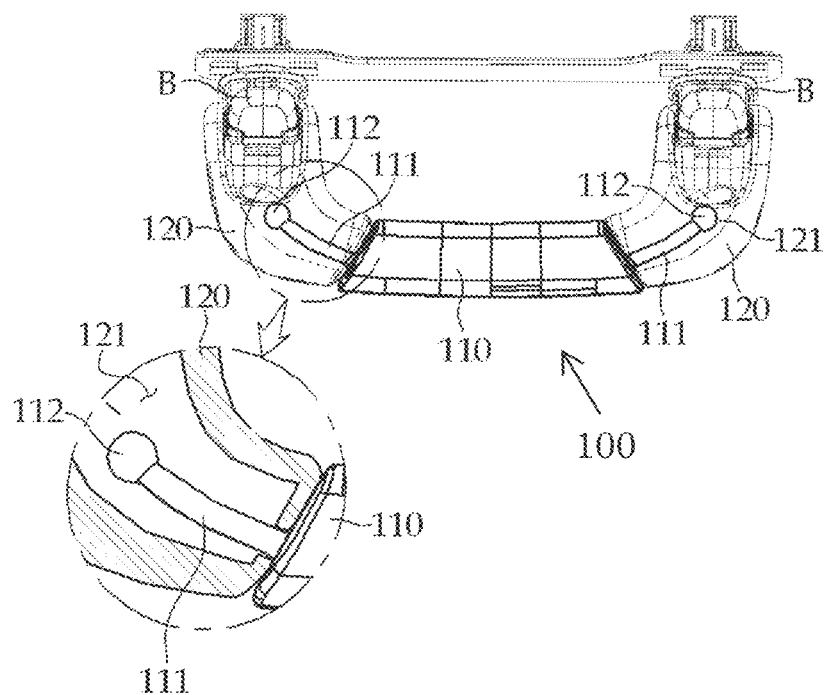
Figure 5A:
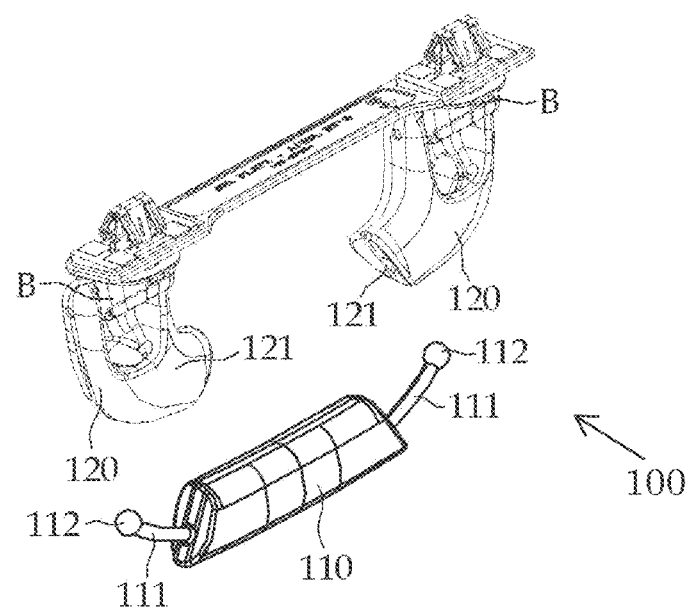
FIG. 5A is a perspective view and FIG. is a front view.
Figure 5B:
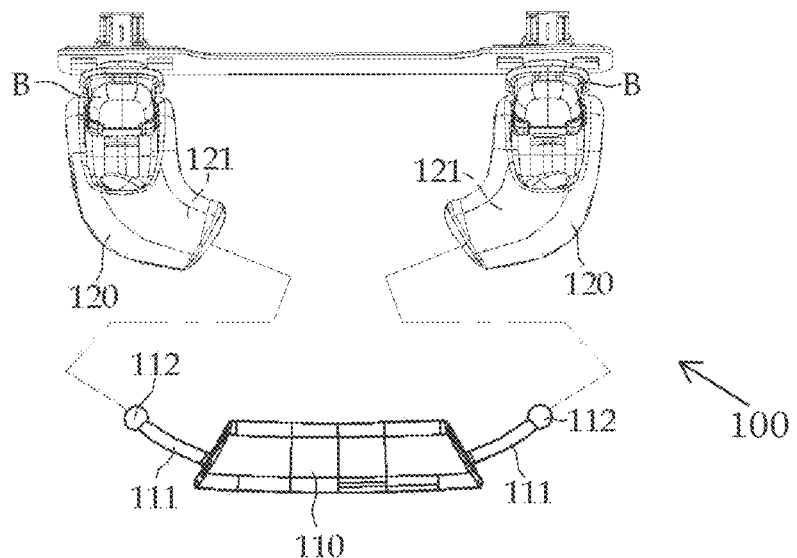
Figure 6:
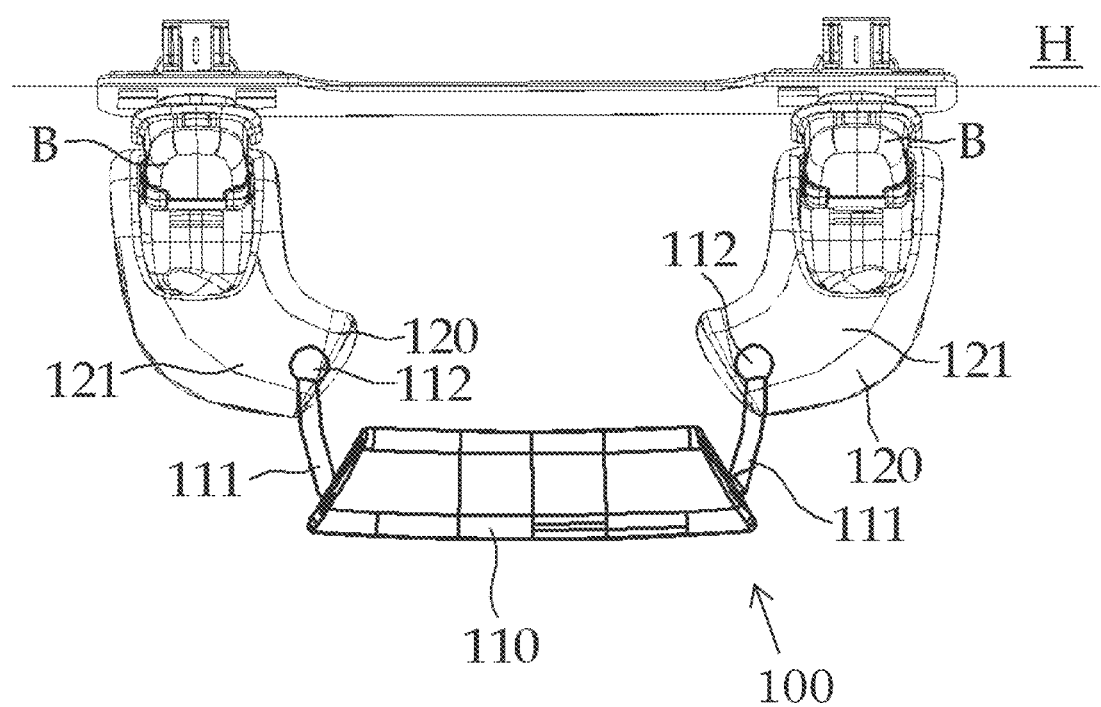
FIG. 6 is a front view illustrating a state in which a height of the assist handle according to the present disclosure has been adjusted.

As illustrated in FIGS. 4 to 6, a height adjustable assist handle for a vehicle according to the present disclosure includes a handle body 100 of which both ends are supported by support brackets B mounted on a head liner H and installed to rotate in place.

In particular, the handle body 100 is divided into an adjustment part 110 that is a middle portion thereof in a length direction and two support parts 120 rotatably supported by the support brackets B on both side portions left after forming the adjustment part 110, and the adjustment part 110 is supported by the two support parts 120 to vertically adjust the height of the assist handle, thereby also allowing an occupant with a small sitting height, such as a child, to conveniently and safely use the assist handle.

In this case, by forming extension members 111 having stepped portions 112 formed on both outer ends thereof on the adjustment part 110 and forming guide holes 121 on the support parts 120 so that the extension members 111 may be accommodated in and drawn out from the support parts 120, as the height adjustment is performed while the adjustment part 110 moves down, the height adjustment is performed by allowing the extension members 111 to be drawn out from the guide holes 121 and then allowing the stepped portions 112 to be caught by inlets of the guide holes 121 to prevent further movement of the extension members 111.

In addition, the adjustment part 110 is manufactured to have a length that is ⅓ to ½ of a length of the handle body 100, thereby allowing people with big hands or small hands to conveniently use the assist handle without inconvenience when using the assist handle.

Hereinafter, such a configuration will be described in more detail with reference to the accompanying drawings as follows. Here, reference numeral "H" denotes a head liner mounted on an interior of a vehicle, and "B" denotes support brackets mounted on the head liner to support the handle body 100 to rotate in place.

Handle Body

As illustrated in FIGS. 4 and 5, both ends of the handle body 100 are elastically supported and rotatably installed by two support brackets B fixed to the head liner H. In this case, the handle body 100 is elastically supported to be in close contact with a surface of the head liner H when not used, and formed to be put back and gripped by an occupant by hand when used.

As illustrated in FIGS. 4 to 6, the handle body 100 is divided into the adjustment part 110 that is the middle portion thereof in the length direction and the two support parts 120 rotatably supported by the support brackets B at both sides of the adjustment part 110.

A. Adjustment Part

As illustrated in FIGS. 4 to 6, the adjustment part 110 is a divided part that is the middle portion of the handle body 100 in the length direction and may allow an occupant who has a small sitting height or a child and thus may not raise a hand high, to pull the adjustment part 110 to perform the height adjustment, thereby allowing the occupant to conveniently use the assist handle.

Therefore, when the length of the adjustment part 110 occupied by the handle body 100 is too large, an occupant who uses the adjustment part 110 may easily use the assist handle, but an occupant who intends to grip the entire handle body 100 by hand may feel inconvenience. Therefore, the adjustment part 110 is manufactured to have the length that is ⅓ to ½ of the length of the handle body 100, and thus it is preferable to manufacture the adjustment part 110 with a length which allows the occupant who uses the entire handle body 100 or the occupant who grips and uses the adjustment part 110 to all conveniently use the assist handle.

As illustrated in FIGS. 4 to 6, the extension members 111 and the stepped portions 112 are formed in the adjustment part 110 manufactured as described above.

1. Extension Member

As illustrated in FIGS. 4 to 6, one extension member 111 is formed at each side of the adjustment part 110. In this case, when the extension members 111 are positioned in the guide holes 121 formed in the support parts 120 to be described below and then the adjustment part 110 is pulled down, the extension members 111 are drawn out from the guide holes 121 to support the adjustment part 110. Therefore, it is preferable that the extension members 111 be made of a flexibly bending material, and the extension members 111 may also be integrally injection-molded when the adjustment part 110 is injection-molded. The injection molding, at this time, may also be performed using the same material, and the extension members made of the elastic material may also be insert-injected and integrally formed with the adjustment part 110.

2. Stepped Portion

As illustrated in FIGS. 4 to 6, the stepped portions 112 are formed on ends protruding outward from the extension members 111. In this case, the stepped portions 112 are for the extension members 111 to be caught by the inlets of the guide holes 121, when inserted into and then getting out of the guide holes 121, in order to prevent the adjustment part 110 from being completely separated from the support parts 120.

B. Support Part

As illustrated in FIGS. 4 to 6, the support parts 120 are parts left after constituting the adjustment part 110, that is, connecting the extension members 111 to the support brackets B for rotatably supporting the handle body 100.

In particular, the support parts 120 are formed with the guide holes 121 so that the extension members 111 and the stepped portions 112 are inserted into the guide holes 121 to be accommodated in and drawn out from the guide holes 121. In this case, it is preferable that the guide holes 121 be configured so that when the extension members 111 are drawn out from the guide holes 121, the stepped portions 112 are caught by the inlets of the guide holes 121 to limit the extension members 111 to be no longer separated from or get out of the guide holes 121.

As described above, according to the present disclosure, since the height adjustment is performed by gripping and pulling down the adjustment part partitioned by dividing a part of the handle body to draw the extension members out from the guide holes 121, an occupant with a small sitting height or a child can easily grip and safely use the assist handle.

A height adjustable assist handle for a vehicle according to the present disclosure has the following effects.

(1) People with small sitting heights such as children can also use the assist handle by pulling an adjustment part down and vertically adjusting a height of the assist handle. Therefore, it is possible to maintain a convenient and comfortable attitude without losing the balance during driving.

(2) In particular, by partitioning a middle portion of a handle body to form extension members on the partitioned adjustment part and forming the extension members slidably fitted into the respective support parts formed at both sides of the adjustment part, it is possible to use the assist handle by pulling the adjustment part down to adjust the height of the assist handle or conveniently use the assist handle by moving the adjustment part up after use to easily return the adjustment part to an original state.

(3) In this case, it is possible to conveniently use the assist handle by allowing the both ends of the adjustment part to maintain a state of being in close contact with the support parts using elastic deformation of the extension members manufactured to be flexibly bent and allowing the adjustment part to easily return to an original position when an occupant releases gripping from the adjustment part after used by adjusting the height of the assist handle.

(4) Meanwhile, since the extension members are formed by integrally extruding the adjustment part upon extrusion-molding, it is possible to easily manufacture and conveniently use the assist handle even without separately manufacturing the extension members.

(5) In addition, since a length of the adjustment part is about ⅓ to ½ of a length of the handle body, an occupant who grips and uses only the adjustment part, such as a child, can also use the assist handle in a comfortable attitude.

What is claimed is:

1. A height adjustable assist handle for a vehicle, comprising a handle body of which both ends are elastically supported by support brackets mounted on a head liner and installed to rotate in place,
wherein the handle body is divided into an adjustment part formed by separating a middle portion thereof in a length direction and two support parts configured to rotatably support on both sides of the adjustment part,
both ends of the adjustment part are formed with extension members flexibly bent and stepped portions formed on ends of the extension members, and
the support parts are formed with guide holes configured to allow the extension members to enter and exit and allow the stepped portions to be caught to limit a length which allows the extension members to get out of the guide holes.

2. The height adjustable assist handle of claim 1, wherein the extension member and the stepped portion are integrally formed when the adjustment part is injection-molded.

3. The height adjustable assist handle of claim 1, wherein the adjustment part is manufactured to have a length that is ⅓ to ½ of a length of the handle body.

4. The height adjustable assist handle of claim 2, wherein the adjustment part is manufactured to have a length that is ⅓ to ½ of a length of the handle body.

\* \* \* \* \*